US012563068B2

(12) United States Patent
Kim et al.

(10) Patent No.: US 12,563,068 B2
(45) Date of Patent: Feb. 24, 2026

(54) ITERATIVE APPLICATION OF USER-SELECTED FILTERS TO LOG EVENTS

(71) Applicant: MICRO FOCUS LLC, Wilmington, DE (US)

(72) Inventors: Mijung Kim, Santa Clara, CA (US); Manish Marwah, Pleasanton, CA (US); Martin Fraser Arlitt, Ottawa (CA)

(73) Assignee: Micro Focus LLC, Austin, TX (US)

( * ) Notice: Subject to any disclaimer, the term of this patent is extended or adjusted under 35 U.S.C. 154(b) by 113 days.

(21) Appl. No.: 18/427,993

(22) Filed: Jan. 31, 2024

(65) Prior Publication Data

US 2025/0247406 A1      Jul. 31, 2025

(51) Int. Cl.
*H04L 9/40*        (2022.01)
(52) U.S. Cl.
CPC .......... *H04L 63/1425* (2013.01); *H04L 63/20* (2013.01)

(58) Field of Classification Search
CPC ........................... H04L 63/1425; H04L 63/20
See application file for complete search history.

(56) References Cited

U.S. PATENT DOCUMENTS

| | | | | |
|---|---|---|---|---|
| 5,925,126 A | * | 7/1999 | Hsieh .................. | G06F 21/6281 |
| | | | | 726/19 |
| 6,347,374 B1 | * | 2/2002 | Drake ................. | H04L 43/0811 |
| | | | | 709/224 |
| 6,405,170 B1 | * | 6/2002 | Phillips ................... | G10L 15/22 |
| | | | | 704/E15.04 |
| 6,606,598 B1 | * | 8/2003 | Holthouse ............... | G10L 15/22 |
| | | | | 704/E15.04 |
| 2019/0097873 A1 | * | 3/2019 | Nucci ................... | G06F 11/008 |

* cited by examiner

*Primary Examiner* — El Hadji M Sall
(74) *Attorney, Agent, or Firm* — Sheridan Ross P.C.

(57) ABSTRACT

Log events for a target system are received. In each of a number of iterations, selection of a filter from a library of preexisting filters is received from a user, the selected filter is applied to the log events to generate filtered log events, and the filtered log events are displayed to the user. In each iteration other than a first iteration, the selected filter is applied to the filtered log events that are generated in an immediately preceding iteration.

20 Claims, 8 Drawing Sheets

100

107    TARGET SYSTEM

108    LOG EVENTS

PREPROCESSING 106

110    KNOWN SECURITY ISSUE FILTERING

112    FILTERED LOG EVENTS

114    KNOWN SECURITY ISSUES

ITERATIVE PROCESSING 102

104    (REMAINING) LOG EVENTS

116    USER SELECTION OF FILTER

118    FILTER APPLICATION

122    REMOVED LOG EVENTS

120    FILTERED LOG EVENTS

124    DISPLAY

126    FURTHER ITERATION?

YES

NO

128    PREVIOUSLY UNKNOWN AND/OR UNIDENTIFIED SECURITY ISSUE

130    PERFORM ACTION

300

LOG EVENTS ~ 104

INCLUSIONARY FILTER APPLICATION ~ 302

IDENTIFIED LOG EVENTS ~ 304

FILTERED LOG EVENTS ~ 120

REMOVE IDENTIFIED LOG EVENTS FROM ALL LOG EVENTS ~ 310

NEXT ITERATION

308

REMOVED LOG EVENTS ~ 122

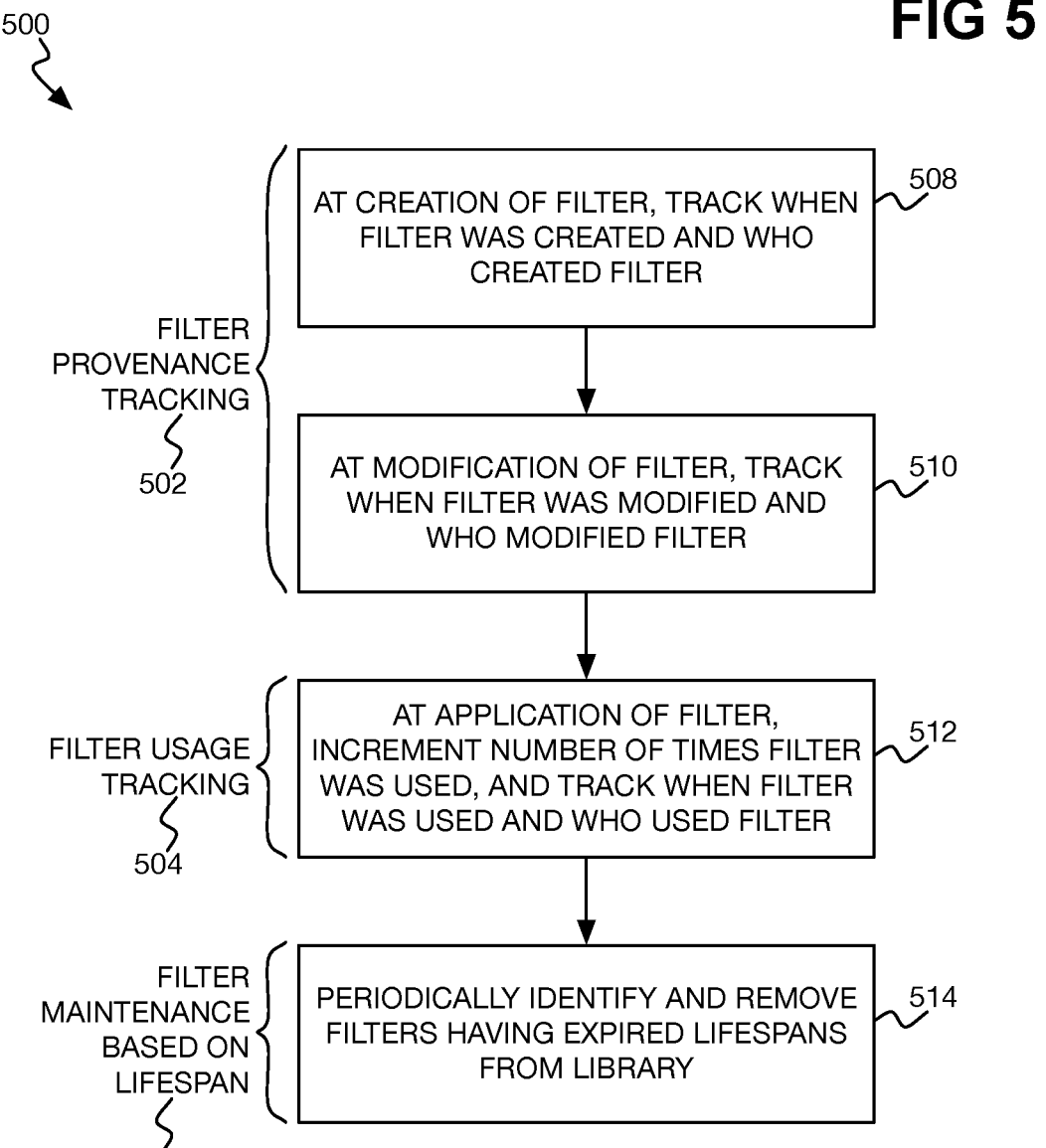

FILTER PROVENANCE TRACKING
502

AT CREATION OF FILTER, TRACK WHEN FILTER WAS CREATED AND WHO CREATED FILTER
508

AT MODIFICATION OF FILTER, TRACK WHEN FILTER WAS MODIFIED AND WHO MODIFIED FILTER
510

FILTER USAGE TRACKING
504

AT APPLICATION OF FILTER, INCREMENT NUMBER OF TIMES FILTER WAS USED, AND TRACK WHEN FILTER WAS USED AND WHO USED FILTER
512

FILTER MAINTENANCE BASED ON LIFESPAN
506

PERIODICALLY IDENTIFY AND REMOVE FILTERS HAVING EXPIRED LIFESPANS FROM LIBRARY
514

ITERATIVE APPLICATION OF USER-SELECTED FILTERS TO LOG EVENTS

BACKGROUND

A significant if not the vast majority of computing devices are globally connected to one another via the Internet. While such interconnectedness has resulted in services and functionality almost unimaginable in the pre-Internet world, not all the effects of the Internet have been positive. A downside, for instance, to having a computing device potentially reachable from nearly any other device around the world is the computing device's susceptibility to malicious cyberattacks that likewise were unimaginable decades ago. Additionally, in an enterprise or other organization having large numbers of such computing devices, the devices have to be properly configured in order for them to optimally communicate with other devices over the Internet and other networks.

BRIEF DESCRIPTION OF THE DRAWINGS

FIG. 5 is a flowchart of an example method for managing and tracking existing filters in a filter library to maintain the library.

DETAILED DESCRIPTION

Figure 1:
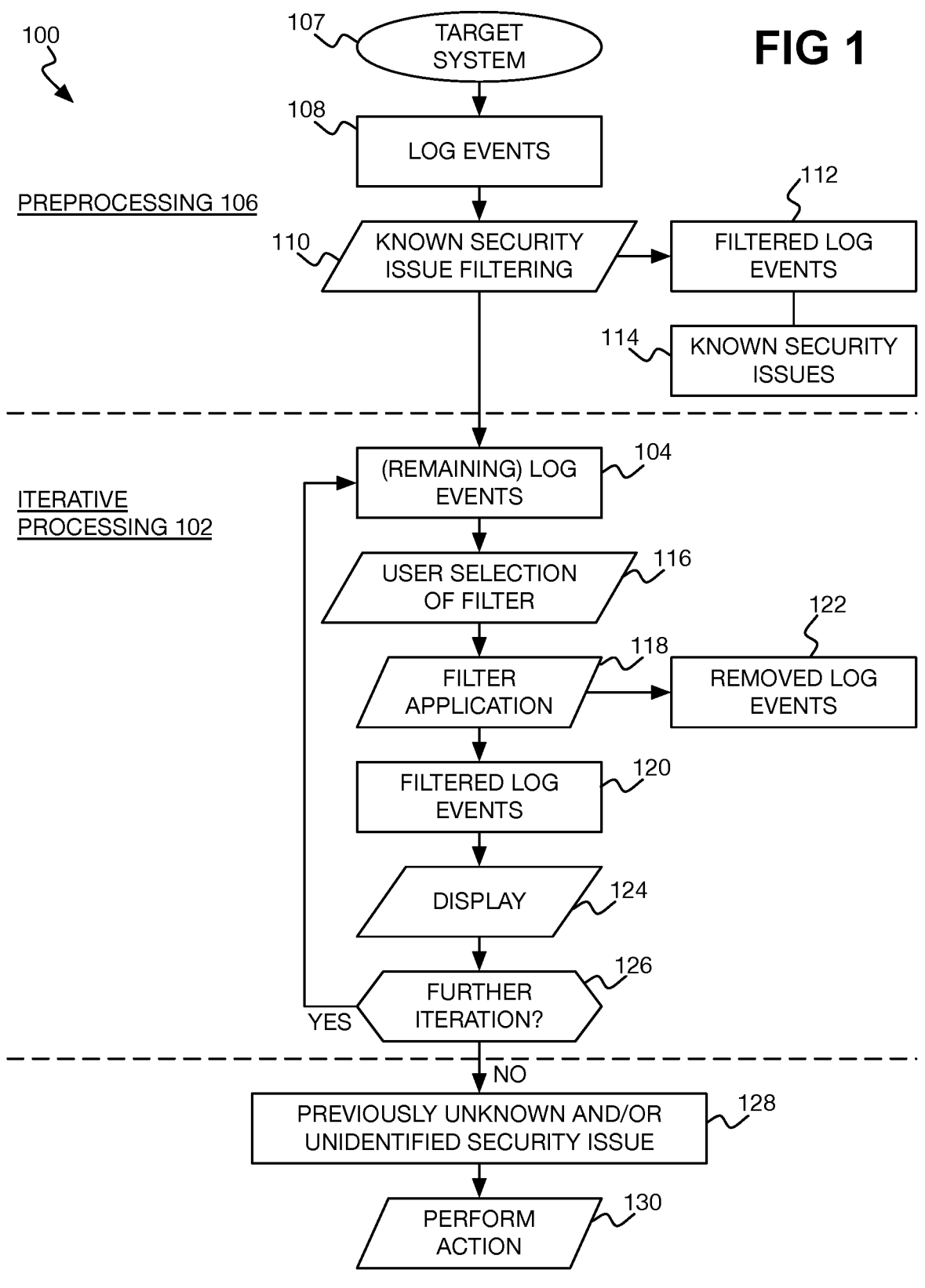
FIG. 1 is a flowchart of an example method for iteratively applying user-selected filters to log events to identify previously unknown security issues.

As noted in the background, a large percentage of the world's computing devices can communicate with one another over the Internet, which is generally advantageous. Computing devices like servers, for example, can provide diverse services, including email, remote computing device access, electronic commerce, financial account access, and so on. However, providing such a service can expose a server computing device to cyberattacks, particularly if the software underlying the services has security vulnerabilities that a nefarious party can leverage to cause the application to perform unintended functionality and/or to access the underlying server computing device.

Individual servers and other devices, including other network devices and computing devices other than server computing devices, may output log events indicating status and other information regarding their hardware, software, and communication. Such communication can include intra-device and inter-device communication as well as intra-network (i.e., between devices on the same network) and inter-network (i.e., between devices on different networks, such as devices connected to one another over the Internet) communication.

As another example, log events can include operating system resource usage and identification of system calls invoked by processes running on a device. The terminology log event is used generally herein, and encompasses all types of data that such devices, or hosts or sources, may output. For example, such data that is encompassed under the rubric of log events includes that which may be referred to as messages, as well as that which may be stored in databases or files of various formats.

To detect potential security vulnerabilities and potential cyberattacks by nefarious parties, as well as to detect other types of security issues, such as device misconfiguration and operational and/or business issues, voluminous amounts of data in the form of such log events may be collected and then analyzed in an offline or online manner to identify such anomalies. An enterprise or other large organization may have a large number of servers and other devices that output log events. The log events may be consolidated so that they can be analyzed en masse. Some anomalies, for instance, may be more easily detected or may only be able to be detected by analyzing interrelationships among the log entries of multiple devices, or sources. Analyzing the log events of just one computing device may not permit such anomalies to be detected.

Filters for known security issues, such as for known types of security vulnerabilities or for known types of cyberattacks, for instance, can be developed by skilled security personnel. Once developed, such a filter can be applied to log events regarding a target system that have been collected, either in an automated manner or by less skilled users, to detect whether the target system has a known security issue. The filter may identify the log events that pertain to a corresponding security issue, and a user may then be able to further filter the identified log events in relatively simplistic ways (e.g., by network address, date, time, and so on) to gain an understanding as to, for instance, which part of the target system particularly has the security issue.

However, not all security issues are known. That is, a target system may have an unknown security issue in that the system has a weakness that no one is aware of. If a nefarious party identifies this weakness before a party who is not malicious, they may be able to develop what is known as a zero-day attack. In this situation, the vulnerability and the technique used to comprise it (i.e., the attack) are unknown to non-malicious parties. Once a non-malicious party discovers the vulnerability and/or the method of attack, they can share the information, at which time the attack becomes known. Furthermore, there are non-malicious parties who proactively attempt to identify weaknesses in systems, so that the vulnerabilities and potential methods of attack become known and can be addressed before zero-day attacks are developed.

Existing filters developed to uncover particular known security issues are unlikely to be able to detect unknown security issues when applied against the log events of a target system. Automated usage of existing filters may thus not able to detect whether target systems have any currently unknown security issue. Less skilled users who are only able to apply filters for known security issues will therefore not be able to uncover other, currently unknown security issues.

Rather, more skilled users, such as skilled security personnel, are needed to discern whether the log events of a target system are indicative of a presently unknown security issue. These users may then create new filters that can be applied in the future in an automated manner or by less skilled users. In a given enterprise or other organization, though, there may be relatively few such skilled security personnel available. Moreover, as a general matter there are not currently enough skilled security personnel globally available to handle the ever-increasing security needs of organizations so that presently unknown security issues are detected in a timely manner.

An enterprise or other organization that relies only upon filters corresponding to known security issues may develop a false sense of security in concluding that its target systems do not have any security issues when the filters cannot identify any. Hiring sufficient numbers of skilled personnel to uncover currently unknown security issues in a timely manner, or retaining the services of third parties to do so, is an option available only to organizations that can afford to do so. Such options are expensive since global security needs have outstripped the available supply of skilled users, as noted above. Moreover, increasing the number of skilled security personnel to meet global security needs has thus far proven not to be a viable solution.

Techniques described herein ameliorate these and other issues. Preexisting filters are stored in a library. A user, who may be less skilled and not have the coding ability and/or experience presently required to create new filters to detect specific security issues, is able to engage in an iterative process in which filters are selected from the library and applied to the log events of a target system. That is, a second filter may be applied to the log events filtered by a first filter, a third filter may be applied to the log events filtered by the second filter, and so on.

Such iterative application of user-selected filters to log events can permit even a less skilled user to identify that a target system may have a previously unknown (or least a previously unidentified) security issue. That is, the user is able to winnow the log events of a target system to a smaller number that may be indicative that there is a previously unknown and/or unidentified security issue at the target system. While the user may not be able to determine what the actual security issue is, they can forward the winnowed log events to more skilled security personnel who can assess if the log events indicate an actual security issue.

Therefore, skilled security personnel that are relatively few in number can be leveraged to more effectively manage the security needs of a larger number of target systems. Rather than such skilled users engaging in laboriously teasing out whether the log events that have been collected for a target system are indicative of a new security issue, the techniques described herein permit less skilled users to initially identify potential such candidate log events. The more skilled users then just have to identify whether these identified candidate subsets of log events actually indicate that the target system has a security issue.

FIG. 1 shows an example method 100 for iteratively applying user-selected filters to log events to identify previously unknown security issues. The method 100 is performed in relation to log events 108 pertaining to a target system 107. The target system 107 may be a collection of servers and other devices of an enterprise or other organization that are networked together. The log events 108 may initially undergo preprocessing 106 to identify any known security issues 114 at the target system 107. The security issues 114 are known in that they are types of security issues that are known, and not in that the target system 107 is already known to have the security issues 114.

For instance, the log events 108 can be subjected to known security issue filtering (110), such as by applying already created filters corresponding to known types of security issues as described above. Application of such filters for known security issues results in filtered log events 112. The filtered log events 112 are a subset of the log events 108, and are the log events 112 that pertain to the known security issues 114 at the target system 107. That is, the filtered log events 112 are those of the collected log events 108 that are indicative of the target system 107 having the known security issues 114.

The collected log events 108 that remain after the filtered log events 112 are removed are denoted as the remaining log events 104. The method 100 includes performing iterative processing 102 on the remaining log events 104. That is, in one implementation, the iterative processing 102 is performed after any known security issues 114 have already been identified at the target system 107, and the filtered log events 112 pertaining to these security issues 114 removed from the log events 108. It can be stated that the processing 102 receives the remaining log events 104 in this respect. In another implementation, such preprocessing 106 may not be performed prior to the iterative processing 102.

The iterative processing 102 includes receiving user selection of a filter from a library of preexisting filters (116). The user may not be skilled security personnel, and therefore may not themselves be able to manually create such a filter to identify any known type of security issue. The preexisting filters may thus be created by skilled security personnel for less skilled users to use. The preexisting filters may or may not themselves correspond to known types of security issues. As one example, the preexisting filters may correspond to more functional types of filtering, such as by filtering based on various attributes of the log events.

The iterative processing 102 includes applying the user-selected filter to the log events 104 (118) to generate filtered log events 120. The filtered log events 120 are those log events 104 that are of interest after application of (e.g., that are identified by) the selected filter. Log events 104 other than the filtered log events 120 are removed, and are depicted as removed log events 122. The iterative processing 102 includes displaying the filtered log events 120 to the user (124), so that the user can assess whether the log events 120 are potentially indicative of a previously unknown and/or unidentified security issue at the target system 107.

As part of the display of the filtered log events 120 in 124, the user can be provided with ways to interactively manipulate the log events 120, such as by sorting the events 120 by various characteristics, and so on. Furthermore, in the first iteration of the processing 102, the log events 104 remaining after the known security issue filtering is applied in 110 in the preprocessing 106 may be displayed so that the user can view the log events 104 when selecting filter in 116 that is then applied in 118.

The user can perform further iterations as desired (126). The log events 104 to which the filter selected by the user in the first iteration are applied can be those that remain after preprocessing 106 has been performed to remove log events 112 pertaining to already known security issues, as has been noted. By comparison, the log events 104 to which the filter selected by the user in each iteration other than the first iteration are applied are the filtered log events 120 generated in the immediately preceding iteration. In this way, even a less skilled user is able to winnow log events 108 to a much smaller set of filtered log events 120 that are anomalous in the eyes of the user, and therefore deserving of additional scrutiny be a more skilled user.

The filtered log events 120 remaining after the most recent iteration may ultimately be determined as corresponding to a previously unknown and/or unidentified security issue 128. That is, after (at least) the filtered log events 120 have been forwarded to skilled security personnel (i.e., after the last iteration has been performed), such a more skilled user may determine that the log events 120 indeed indicate that the target system 107 has such a security issue 128. In this case, a remedial action may be performed (130) on the target system 107 to resolve the security issue 128 identified based on the filtered log events 120.

The information that is forwarded to the skilled user may include all the log events 108 and/or the log events 104 that remain after known security issue filtering has been performed in 110, with the filtered log events 120 that remain after the last iteration identified. The forwarded information may include identification of the known security issue filters that were performed in 110. The forwarded information may include the filters that the user selected in 116 in each iteration, and the order in which the filters were selected over all the iterations.

For instance, the target system 107 may be manually or automatically configured to mitigate if not resolve the security issue 128, and thus improve computing system security. More specifically, the servers or other devices that are referenced in the filtered log events 120 on which basis the security issue 128 has been identified may be reconfigured. In some cases, these devices may automatically have their network connectivity disconnected or may otherwise be quarantined until they can be manually inspected and reconfigured to resolve the security issue 128.

Figure 2:
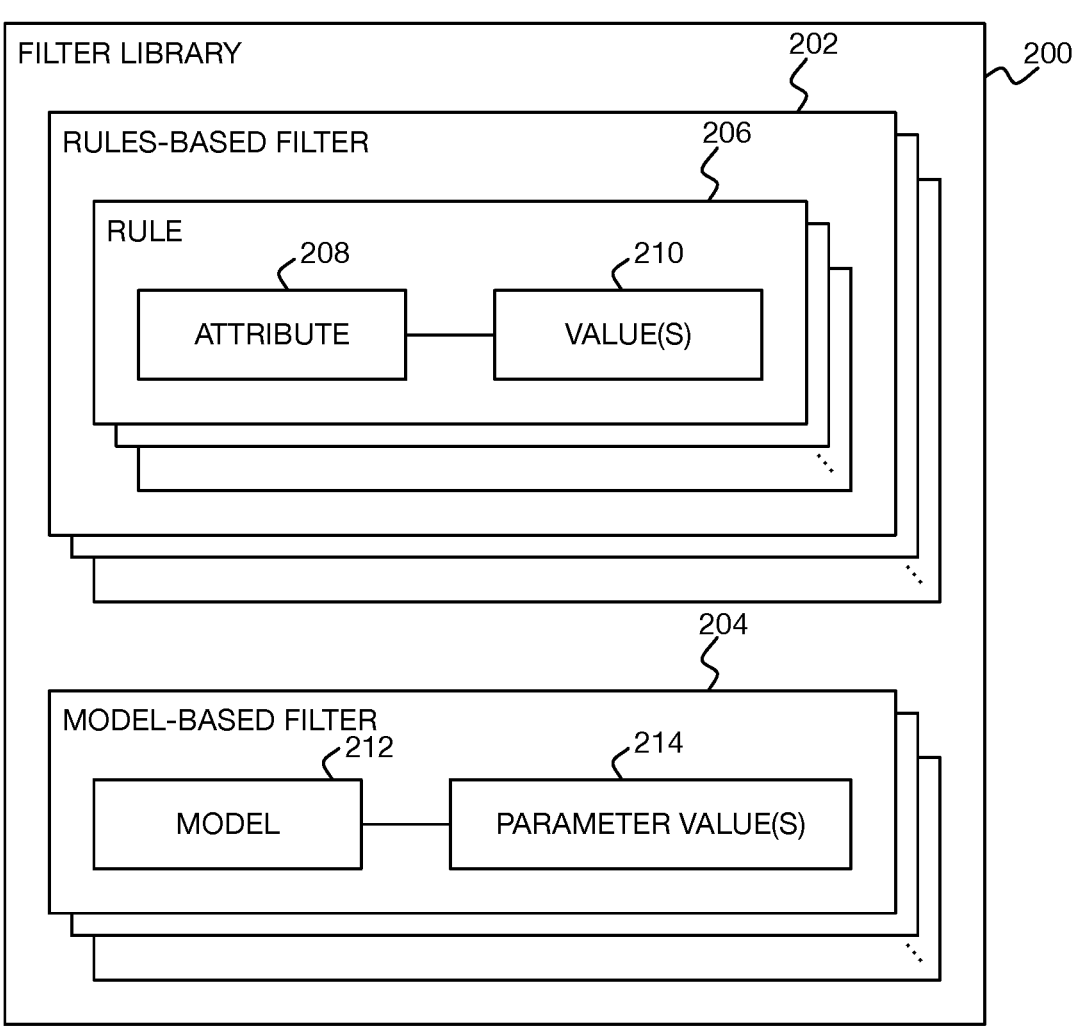
FIG. 2 is a diagram of an example filter library of existing filters that can be iteratively applied to log events.

FIG. 2 shows an example filter library 200 from which the user can select a filter to apply to log events 104 in a given iteration. The library 200 can include preexisting rules-based filters 202 and/or preexisting model-based filters 204. Each rule-based filter 202 defines one or more rules 206 that are evaluated against log events 104 when the filter 202 is applied. A rule-based filter 202 may define how its rules 206 of are to be evaluated in relation to one another, such as via Boolean logic or in another manner, in order to specify the log events 104 that satisfy the filter 202.

Each rule 206 may be an inclusionary rule or an exclusionary rule. An inclusionary rule 206 defines which log events 104 satisfy the rule 206, whereas an exclusionary rule 206 defines which log events 104 do not satisfy the rule 206. For example, a rule 206 may define log events 104 pertaining to a particular device having a given network address. If the rule 206 is inclusionary, then those log events 104 pertaining to the particular device satisfy the rule 206. By comparison, if the rule 206 is exclusionary, then log events 104 other than those which pertain to the particular device satisfy the rule 206.

Each rule 206 specifies attributes 208 for which at least some of the log events 104 have values. Examples of attributes 208 include network address, event time, event type, transport protocol, source network port, destination network port, network transport protocol, event duration, number of packets, number of bytes, and so on. For each attribute 208 specified by a rule 206, the rule 206 specifies one or more values 210 to denote the log events 104 that are subject to the rule 206 (on an either inclusionary or exclusionary basis). The values 210 may be expressed as individual, discrete values, or as one or more value ranges.

As a particular example, the log events 104 may be virtual private cloud (VPC) flow logs, which are log events concerning virtual networks that provide network functionality to virtual machine (VM) instances, resource clusters, and serverless workloads. Each such log event 104 includes an action, such as whether a particular activity requested by a source device in relation to a destination device was rejected or accepted. Each log event 104 may also identify the type of the particular activity requested, the network address of the source device, and the network address of the destination device, among other information.

Each model-based filter 204 defines a model 212 that is evaluated against log events 104 when the filter 204 is applied. Each model-based filter 204 may particularly specify a preexisting model 212 and one or more parameter values 214. For example, the model 212 may be a machine learning-based model of a particular type, such as a logistic regression model, a random forest model, a gradient boosted tree model, a deep neural network model, and so on. The models 212 are preexisting in that they have already been trained. Each model 212 has parameters for which values 214 are specified to indicate how the model 212 is to be applied—that is, the types of log events 108 that should be identified when the model 212 is run.

Different model-based filters 204 can therefore specify or correspond to the same model 212, but specify different parameter values 214 of that model 212. Such model-based filters 204 can be considered as being different instances of the same underlying model 212 in accordance with the parameter values 214 that they specify for the model 212. For example, a machine learning model 212 may be able to classify log events 104 into different event types that are not explicitly indicated by their attributes 208 (that is, there is no attribute 208 corresponding to such an event type). The parameter values 214 in this case are one or more of these event types, such that a particular filter 204 for such a model 212 returns the events 104 having the event types specified by the parameter values 214 of that filter 204.

Figure 3A:
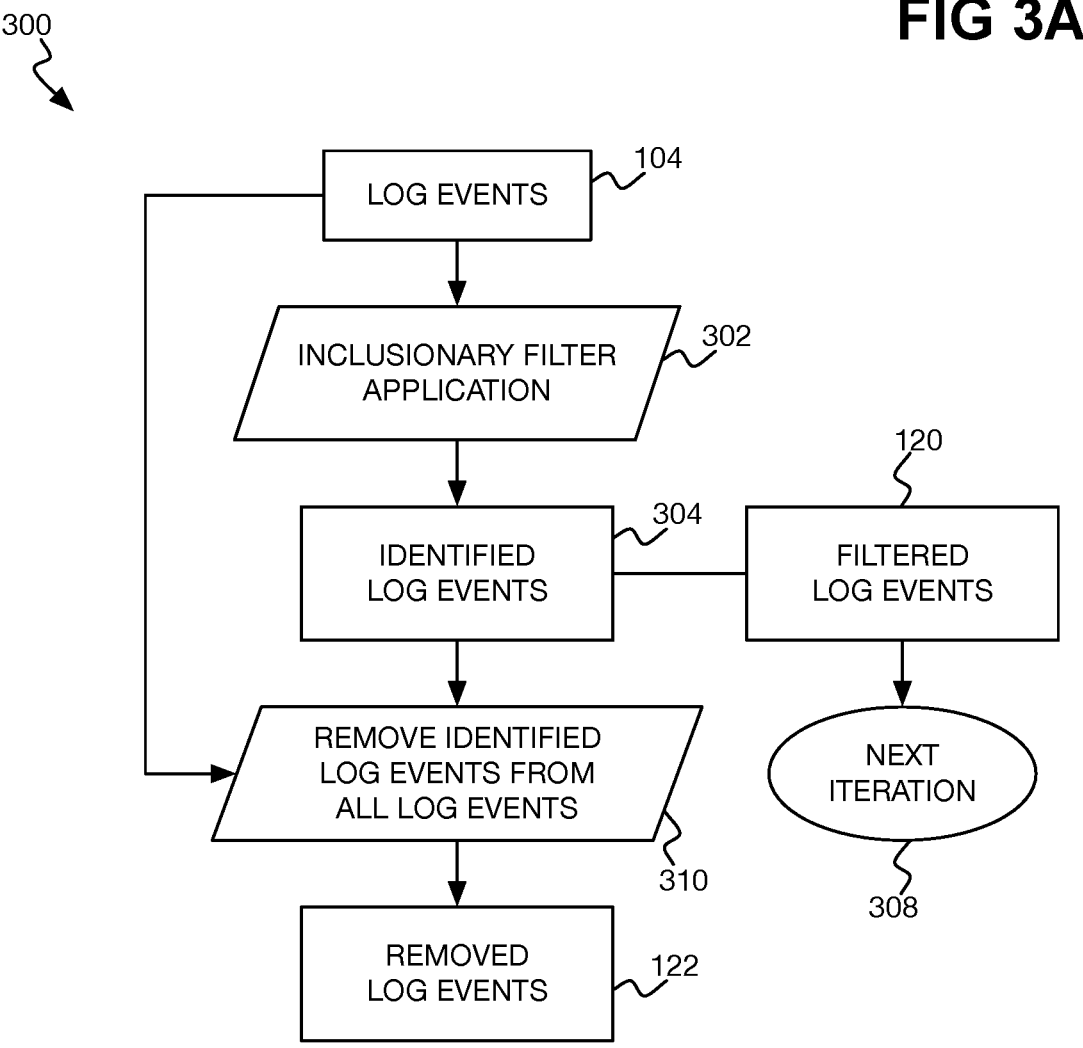
FIG. 3A is a flowchart of an example method for applying an inclusionary filter.

FIG. 3A shows an example method 300 for applying an inclusionary filter in a given iteration. A filter is inclusionary in that those of the log events 104 identified by the filter constitute the filtered log events 120, and the log events 104 not identified by the filter constitute the removed log events 122. Specifically, applying (302) an inclusionary filter on log events 104 results in the filter identifying a subset of the log events 104, which are denoted as the identified log events 304. These identified log events 304 constitute the filtered log events 120, which are therefore the log events 104 subject to the next iteration 308 (if any). The log events 104 that remain after removal (310) of the identified log events 304 are the removed log events 122.

Figure 3B:
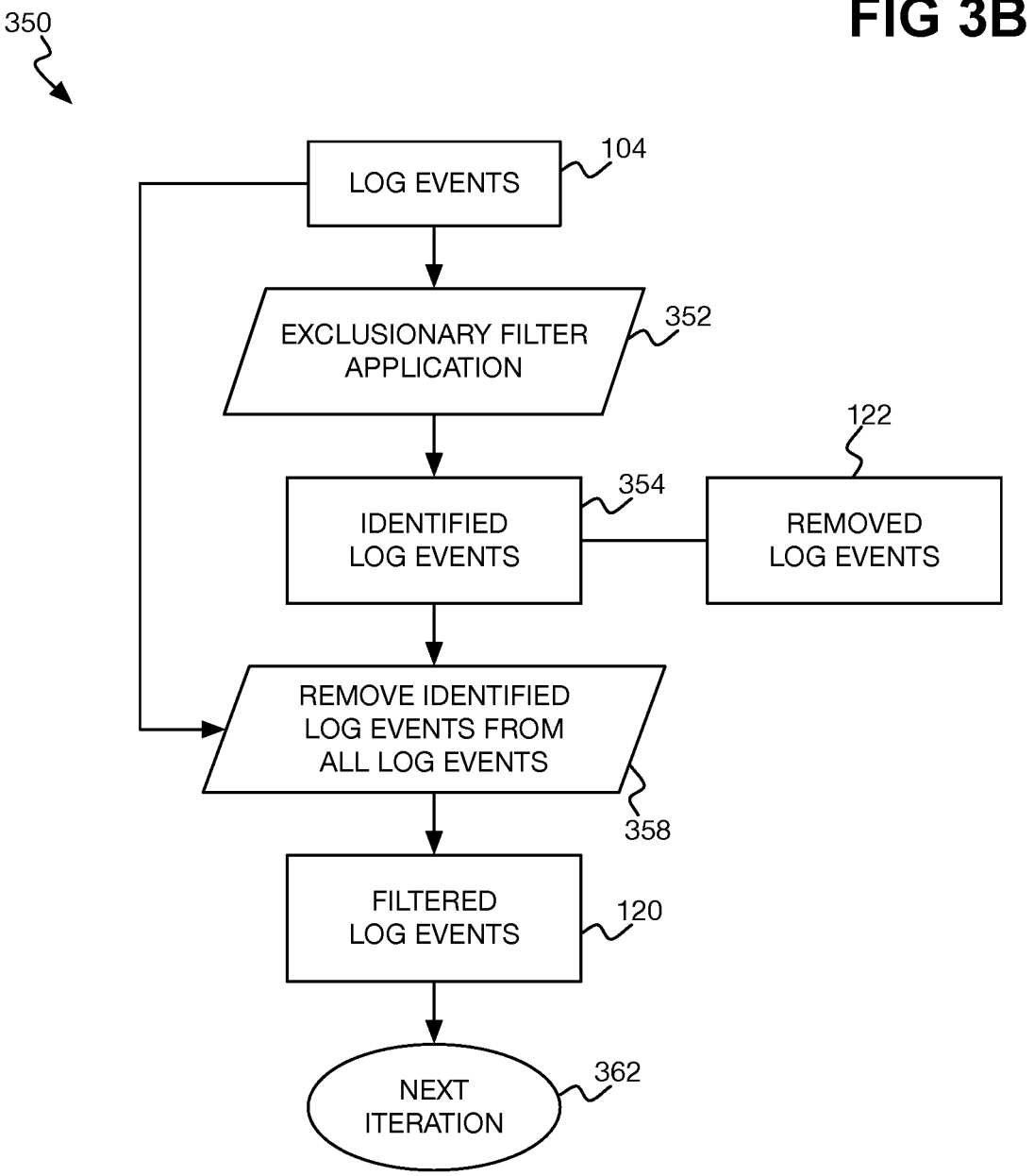
FIG. 3B is a flowchart of an example method for applying an exclusionary filter.

FIG. 3B, by comparison, shows an example method 350 for applying an exclusionary filter in a given iteration. A filter is exclusionary in that those of the log events 104 identified by the filter constitute the removed log events 122, and the log events 104 not identified by the filter constitute the filtered log events 120. Specifically, applying (352) an exclusionary filter on log events 104 results in the filter identifying a subset of the log events 104, which are denoted as the identified log events 354. These identified log events 354 constitute the removed log events 122. The log events 104 that remain after removal (358) of the identified log events 354 are the filtered log events 120, which are therefore the log events 104 subject to the next iteration 362 (if any).

A given exclusionary or inclusionary filter may be a rules-based filter 202 or a model-based filter 204. Furthermore, an exclusionary filter and an inclusionary filter may be the same filter based on what the user wants to identify, but for the former being exclusionary and the latter being inclusionary. For example, in the case in which both filters are rule-based filters 202, both may have the same rules 206. However, in an exclusionary filter, the log events 104 identified by the rules 206 are removed such that those that remain constitute the filtered log events 120. By comparison, in an inclusionary filter, the log events 104 identified by the rules 206 constitute the filtered log events 120.

In the iterative processing 102 that has been described, in each iteration a user selects a filter from a library 200 of preexisting filters, which is then applied to the log events 104 to generate the filtered log events 120. The user may also be able in any iteration to create a new filter based on the filtered log events 120 that are generated and then displayed. The new filters may be added to the filter library 200, so that they can be selected and applied when the method 100 is performed again in the future. The new filters are created in such a way that the user does not have to be skilled in coding or have to have security-related domain expertise in order to create them, such that even less skilled users may be able to create new filters.

Figure 4A:
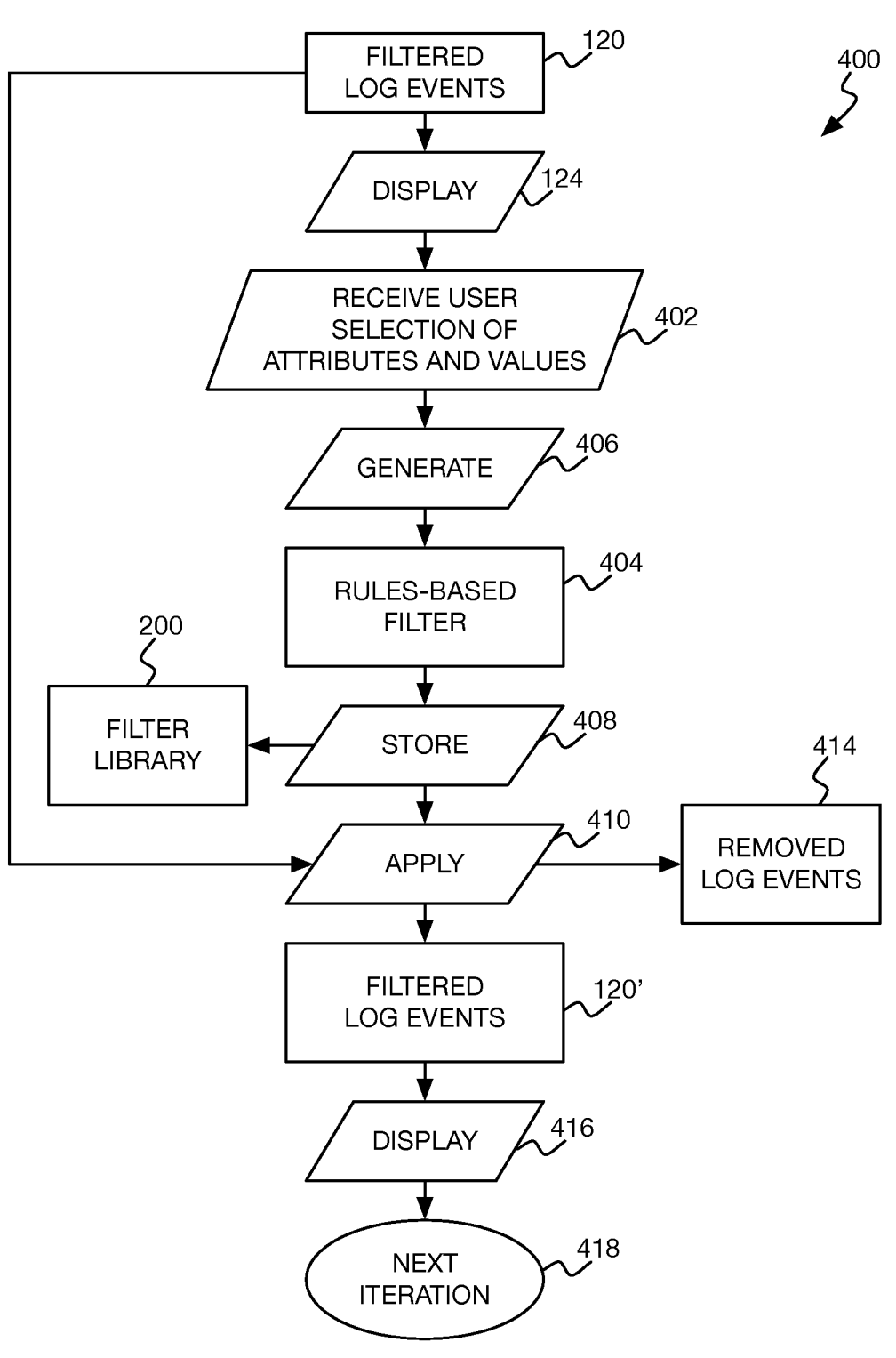
FIG. 4A is a flowchart of an example method for generating a new rules-based filter.

FIG. 4A shows an example method 400 for creating a new rules-based filter 404 in a given iteration. The filtered log events 120 generated in the iteration are displayed (124) as has been described. The filtered log events 120 may, for instance, be displayed as a grid having horizontal rows corresponding to the log events 120 and vertical columns corresponding to their attributes. Therefore, each horizontal row corresponds to a given log event 108, and in each vertical column includes the value specified by that event 108 for the corresponding attribute of the vertical column in question.

The filtered log events 120 may be displayed in other ways as well. For example, a user may specify that a histogram be displayed for a specified attribute of the log events 120. The histogram can include a number of bars that each correspond to a value (or a range of values, or an aggregate value) of that attribute. The height of each bar corresponds to the number of log events 120 having that value (or having values in the corresponding value range). More generally, the filtered log events 120 can be displayed in different ways to permit a user to identify which of the log events 120 are of interest.

The method 400 includes receiving (402) user selection of one or more particular attributes of the filtered log events 120, and one or more values (which may be specified as a range of values) for each such attribute. A new rules-based filter 404 is then generated (406) that has exclusionary or inclusionary rules corresponding to the selected values of the selected attributes. That is, there is a rule for each selected attribute and the values specified for that attribute. The user specifies which rules are exclusionary and which rules are inclusionary, and how the rules are to be evaluated in combination, such as via Boolean logic. The user also specifies whether the filter 404 itself is exclusionary or inclusionary. The filter 404 is thus generated via user interaction.

The rules-based filter 404 may be stored (408) in the filter library 200 so that it can be reused in the future. The rules-based filter 404 is applied (410) to the filtered log events 120 to further winnow the events 120. The log events 120 that remain after the rules-based filter 404 is applied are denoted as the filtered log events 120', whereas the log events 120 that are discarded are denoted as the removed log events 414. The filtered log events 120' are displayed (416), and constitute the log events 104 that are subject to the next iteration 418 (if any).

Figure 4B:
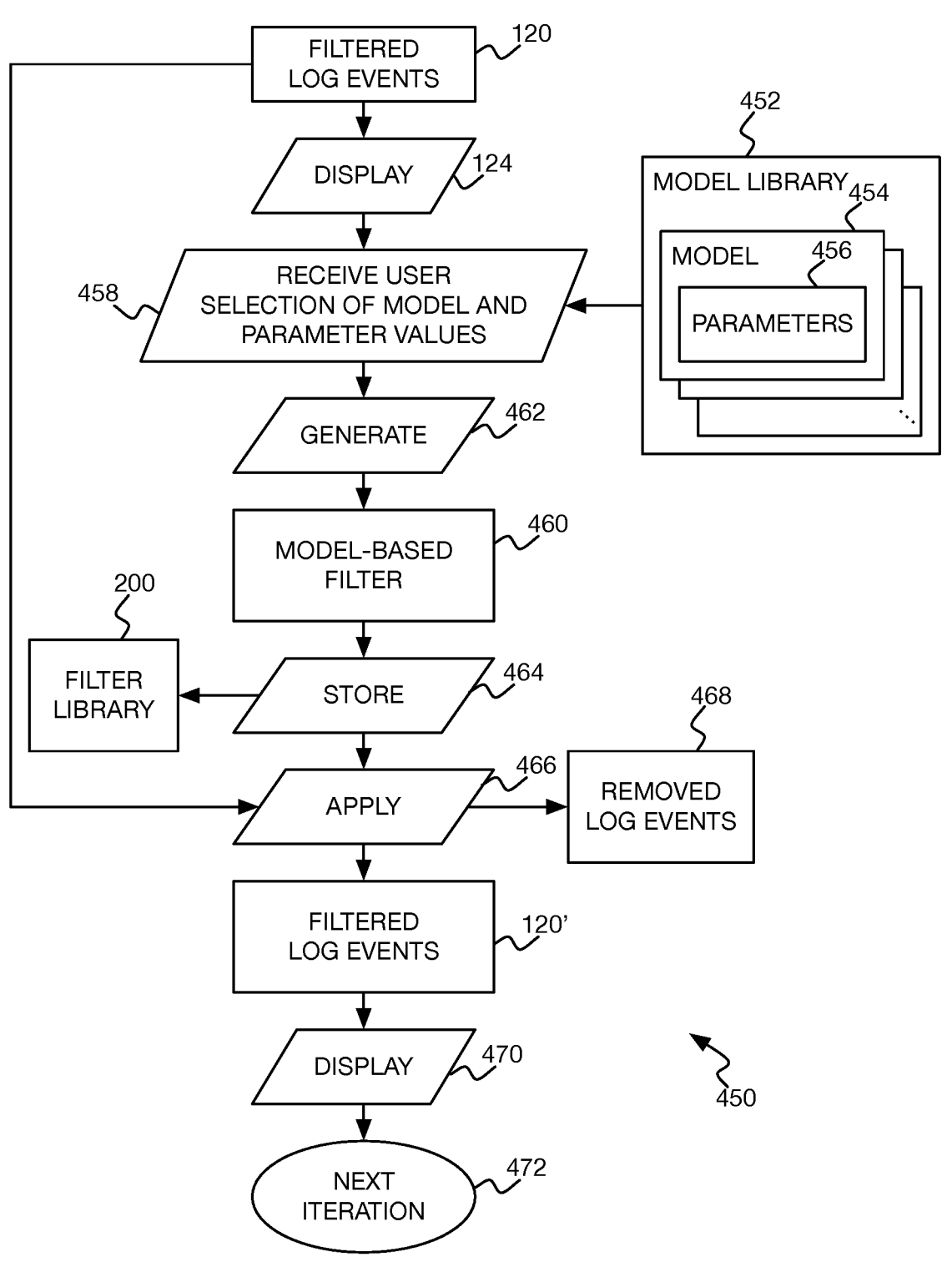
FIG. 4B is a flowchart of an example method for generating a new model-based filter.

FIG. 4B, by comparison, shows an example method 450 for creating a new model-based filter 460 in a given iteration. The filtered log events 120 that are generated in the iteration are displayed (124) as before. There can be a model library 452 of preexisting models 454 that each have one or more corresponding parameters 456. As described above, for instance, a given preexisting model 454 may be able to classify log events 120 into different event types that are not explicitly indicated by their attributes. A user can select a preexisting model 454 and specify the values for its parameters 456 in order to create a new model-based filter 460.

The method 450 thus includes receiving (458) such user selection of a model 454 and values for the parameters 456. The new model-based filter 460 is generated (462) by instantiating the model 454 in accordance with the user-selected values for the parameters 456. As such, the filter 460 is generated via user interaction. The model-based filter 460 may be stored (464) in the filter library 200 so that it can be reused in the future, and the filter 460 applied (466) to the filtered log events 120 to further winnow the events 120. The log events 120 that remain after the model-based filter 460 is applied are denoted as the filtered log events 120', and the events 120 that are discarded are denoted as the removed log events 468. As before, the filtered log events 120' are displayed (470), and constitute the log events subject to the next iteration 472 (if any).

The filter library 200 of rules-based filters 202 and model-based filters 204, to which new rules-based filters 404 and new model-based filters 460 can be added as has been described, may be maintained in different ways. The filters 202 and 204 can be tracked, for instance, to permit the filters 202 and 204 to be analyzed to identify the types of filters 202 and 204 that are most often created, updated, and/or used, and the users who are most often creating, modifying, and/or using them. The filters 202 and 204 can further be managed to ensure that filters 202 and 204 are suitably removed from the library 200 so that the library 200 does not become full of filters 202 and 204 that have not recently been used and/or that have not been used often.

FIG. 5 shows an example such method 500 for managing and tracking the existing filters 202 and 204 in the filter library 200. The method 500 can include filter provenance tracking 502, filter usage tracking 504, and/or filter maintenance 506 based on lifespan. Provenance tracking 502 entails, when a filter 202 or 204 is created, tracking (508) when the filter 202 or 204 was created and the user who created the filter 202 or 204. Provenance tracking 502 can also entail, each time a filter 202 or 204 is modified, tracking (510) when modification of the filter 202 or 204 occurred, and the user who modified the filter 202 or 204.

Tracking the provenance of filters 202 and 204 in this manner can permit the filter library 200 to be subsequently updated so that the library 200 better serves the users in performing iterative log event filtering. As one example, if a filter 202 or 204 is frequently modified, then this can indicate that there should be multiple filters 202 or 204 with the same underlying rules 206 or model 212, but specifying different attribute values 210 or parameter values 214. The library 200 may be updated so that there is a separate filter 202 or 204 for each modification, and these filters 202 and 204 may be set as read-only so that they cannot be modified in the future.

Filter usage tracking 504 entails, each time a filter 202 or 204 is applied, incrementing a count of the number of times the filter 202 or 204 has been used, and/or tracking when the filter 202 or 204 was used and/or who used the filter 202 or 204 (512). Tracking the usage of filters 202 and 204 can also permit the filter library 200 to be subsequently updated so that the library 200 better serves the users in performing iterative log event filtering. As one example, if particular types of filters 202 or 204 are used most often, this can indicate that users may benefit from having additional, similar types of such filters 202 or 204, such that additional filters 202 and 204 should accordingly be created and added. Similarly, frequently used filters 202 or 204 can be recommended for usage to users, which may be particularly useful when the users are unskilled.

Filter maintenance 506 entails periodically identifying and removing (514) filters 202 and 204 having expired lifespans from the library 200. For example, when a filter 202 or 204 is created, how long it should remain in the library 200 before being removed may be specified. The lifespan of a filter 202 or 204 may be specified by length of time, the date and/or time when the filter 202 or 204 should be removed from the library 200, and/or the number of times that the filter 202 or 204 can be used before being removed. Rather than removal, expired filters 202 and 204 may instead be identified to an administrator or other user, so that the user can decide whether to extend their lifespan or delete them on a per-filter basis.

For example, some filters 202 and 204 may be specific to a particular type of target system 107 or a particular type of log event 108 that is not expected to recur. Therefore, when the filters 202 and 204 are created, limited lifespans may be specified for them. This can ensure that filters 202 and 204 that are no longer relevant do not remain in the library 200, and thus make the library 200 unwieldy to use in that the library 200 stores so many filters 202 and 204 that users become overwhelmed and/or have difficulty in identifying which filters 202 and 204 to actually apply.

The lifespan of a filter 202 or 204 may thus be explicitly specified at filter creation, and may be set to a default lifespan unless the user specifies otherwise. The lifespan of a filter 202 or 204 may instead be implicitly set (as opposed to being explicitly specified by the user) and/or may also be dynamically updated over time. For instance, in the former case, filters 202 and 204 may not have lifespans explicitly specified at creation, but filters 202 and 204 that have not been used recently and/or filters 204 and 204 that have been infrequently used may be periodically removed from the library 200.

Furthermore, even when the lifespan of a filter 202 or 204 is explicitly specified at time of creation, the lifespan may be dynamically updated to take into account its actual usage, and/or based on domain knowledge. For example, at time of creation a filter 202 or 204 may have been thought to being useful for only a relatively short length of time, and/or may have thought to apply only to a particular type of target system 107. The lifespan may have thus been set to expire after a short period of time.

However, during its originally specified lifespan, the filter 202 or 204 may have been used with increasing frequency, suggesting that the filter 202 or 204 has become more relevant and not less relevant over time. Therefore, when the filter 202 or 204 reaches its originally specified lifespan such that it should be considered as having expired, the lifespan may be extended so that the filter 202 or 204 is not deleted at that time from the library 200. In this way, filters 202 and 204 that have proven to be more useful than was anticipated when they were created are not removed from the filter library 200.

Figure 6:
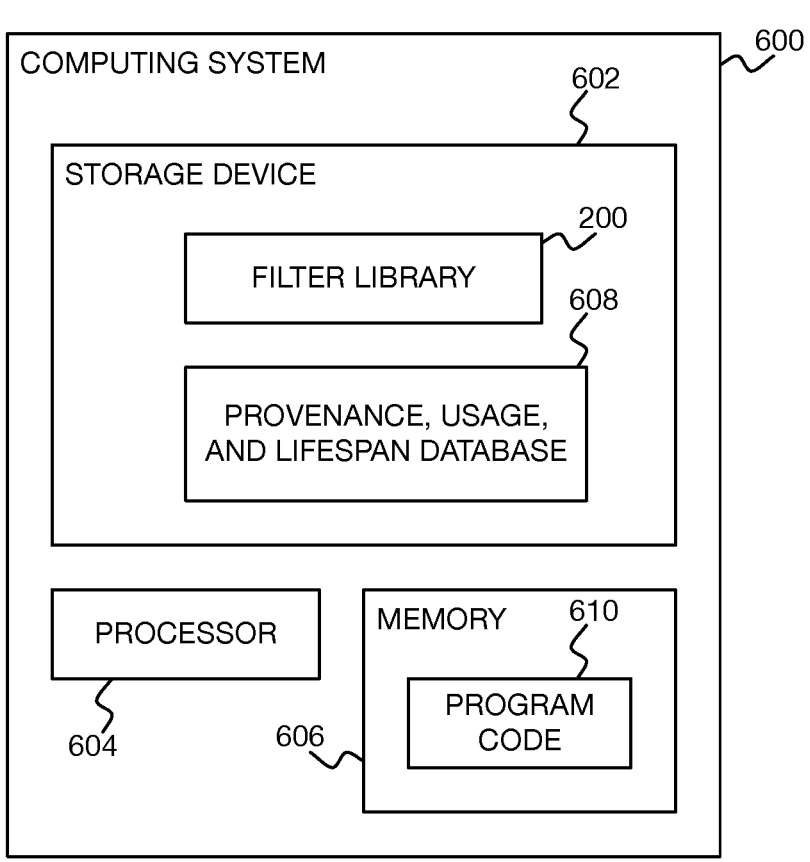
FIG. 6 is a diagram of an example system for iteratively applying user-selected filters to log events.

FIG. 6 shows an example computing system 600. The computing system 600 may be implemented as one or more computing devices, such as server computers, desktop, laptop, and/or notebook computers, as well as other computing devices, including smartphones, tablet computing devices, and so on. The computing system 600 includes a storage device 602, a processor 604, and memory 606.

The storage device 602 is a non-volatile storage device such as a hard disk drive, a solid state drive (SSD), and so on. The storage device 602 stores the filter library 200, and can also store a provenance, usage, and lifespan database 608 to maintain the library 200 as has been described. For instance, for each filter 202 or 204, the database 608 can store filter lifespan as defined at filter generation, and either or both of when the filter 202 or 204 was created and who created it. The database 608 can be updated when a filter 202 or 204 is modified to add either or both of when the modification occurred and who made the modification. The database 608 can further be updated each time a filter 202 or 204 is used, as has been described.

The memory 606 is an example of a non-transitory computer-readable data storage medium (of which the storage device 602 is example as well), and may be a semiconductor memory, for instance. The memory 606 stores program code 610 executable by the processor to perform processing. The processing can include the methods that have been described above.

Techniques have been described herein for iteration application of user-selected filters to log events. The techniques permit previously unknown and/or previously unidentified security issues at target systems to be identified from collected log events pertaining to the target systems. The techniques permit even less skilled users to winnow the collected log events to those that may indicate that a given target system has a security issue that was previously unknown and/or unidentified.

We claim:

1. A non-transitory computer-readable data storage medium storing program code executable by a processor to perform processing comprising:
   receiving a plurality of log events for a target system; and
   in each of a plurality of iterations:
      receiving, from a user, selection of a filter from a library of preexisting filters;
      applying the selected filter to the log events to generate filtered log events; and
      displaying the filtered log events to the user,
   wherein in each iteration other than a first iteration, the selected filter is applied to the filtered log events generated in an immediately preceding iteration.

2. The non-transitory computer-readable data storage medium of claim 1, wherein the filtered log events that remain after a last iteration correspond to a previously unknown and/or unidentified security issue at the target system.

3. The non-transitory computer-readable data storage medium of claim 2, wherein the plurality of log events that are received are the log events that remain after known security issues at the target system have been identified and corresponding log events pertaining to the known security issues have been removed.

4. The non-transitory computer-readable data storage medium of claim 2, wherein the processing further comprises:
   prior to performing the first iteration, identifying known security issues at the target system based on the received plurality of log events and removing the log events pertaining to the known security issues,
   wherein the iterations are performed on the log events that remain after the log events pertaining to the known security issues have been removed.

5. The non-transitory computer-readable data storage medium of claim 2, wherein the processing further comprises:
   performing an action on the target system to resolve the previously unknown and/or unidentified security issue that has become known and has been identified based on the filtered log events that remain after the last iteration.

6. The non-transitory computer-readable data storage medium of claim 1, wherein each preexisting filter is:

an exclusionary filter in that the log events not identified by application of the exclusionary filter are the filtered log events; or an inclusionary filter in that the log events identified by application of the inclusionary filter are the filtered log events.

7. The non-transitory computer-readable data storage medium of claim 1, wherein each preexisting filter is:

a rules-based filter that defines rules that are evaluated against the log events are evaluated to apply the rules-based filter; or a model-based filter that defines a model that is evaluated against the log events to apply the model-based filter.

8. The non-transitory computer-readable data storage medium of claim 1, wherein the selected filter is a machine learning model-based filter.

9. The non-transitory computer-readable data storage medium of claim 1, wherein the processing further comprises, in each of one or more of the plurality of iterations:

after displaying the filtered log events to the user, receiving, from the user, selection of values for attributes of the filtered log events;

generating a new rules-based filter having exclusionary or inclusionary rules corresponding to the selected values for the attributes of the filtered log events;

adding the new rules-based filter to the library of preexisting filters;

applying the new rules-based filter to the filtered log events; and displaying the filtered log events as to which the new rules-based filter has been applied.

10. The non-transitory computer-readable data storage medium of claim 1, wherein the processing further comprises, in each of one or more of the plurality of iterations:

after displaying the filtered log events to the user, receiving, from the user, selection of a model from a library of preexisting models;

receiving, from the user, selection of values for parameters of the selected model;

generating a new model-based filter corresponding to the selected model in accordance with the selected values for the parameters of the selected model;

adding the new model-based filter to the library of preexisting filters;

applying the new model-based filter to the filtered log events; and displaying the filtered log events as to which the new model-based filter has been applied.

11. The non-transitory computer-readable data storage medium of claim 1, wherein each preexisting filter has a lifespan defined at generation of the preexisting filter, the processing further comprising:

identifying, as expired filters, the preexisting filters that have expired lifespans; and removing the preexisting filters identified as expired filters from the library.

12. The non-transitory computer-readable data storage medium of claim 11, wherein the processing further comprises:

tracking provenance of each preexisting filter, including one or multiple of:

either or both of when the preexisting filter was created and who created the preexisting filter; and in a case in which the preexisting filter was modified after creation, either or both of when the preexisting filter was modified and who modified the preexisting filter.

13. The non-transitory computer-readable data storage medium of claim 12, wherein the processing further comprises:

tracking usage of each preexisting filter, including one or multiple of:

a number of times the preexisting filter was applied to any log events; and for each of a plurality of times the preexisting filter was applied, either or both of when the preexisting filter was applied and who applied the preexisting filter.

14. A computing system comprising:

a storage device storing:

a library of preexisting filters to filter a plurality of log events for a target system; and a database storing, for each preexisting filter, a lifespan of the preexisting filter defined at generation of the preexisting filter, and either or both of when the preexisting filter was created and who created the preexisting filter;

a processor; and a memory storing program code executable by the processor to:

in each of a plurality of iterations, receive user selection of a filter from a library of preexisting filters, apply the user selected filter to the log events to generate filtered log events, and display the filtered log events, wherein in each iteration other than a first iteration, the user selected filter is applied to the filtered log events generated in an immediately preceding iteration;

maintain the library by identifying and removing each preexisting filter at expiration based on the lifespan of the preexisting filter; and track provenance of each preexisting filter by, when any preexisting filter is modified, updating the database to add either or both of when modification occurred and who made the modification.

15. The computing system of claim 14, wherein the filtered log events that remain after a last iteration correspond to a previously unknown and/or unidentified security issue at the target system.

16. The computing system of claim 14, wherein the log events to which the user selected filter is applied in the first iteration are the log events that remain after known security issues at the target system have been identified and corresponding log events pertaining to the known security issues have been removed.

17. The computing system of claim 14, wherein the stored program code is executable by the processor to further, in each of one or more of the plurality of iterations:

after displaying the filtered log events, generating, via user interaction, a new filter;

adding the new filter to the library of preexisting filters;

applying the new filter to the filtered log events; and displaying the filtered log events as to which the new filter has been applied.

18. A method comprising:

receiving, by a processor, a plurality of log events for a target system;

in a first iteration of a plurality of iterations:

receiving, by the processor and from a user, selection of a first filter from a library of preexisting filters;

applying, by the processor, the first filter to the log events to generate first filtered log events; and displaying, by the processor, the first filtered log events to the user; and in a second iteration of the plurality of iterations:

receiving, by the processor and from the user, selection of a second filter from the library;

applying, by the processor, the second filter to the first filtered log events to generate second filtered log events; and displaying, by the processor, the second filtered log events to the user.

19. The method of claim 18, wherein the first filtered log events that remain after a last iteration correspond to a previously unknown and/or unidentified security issue at the target system, and wherein the log events to which the first filter is applied in the first iteration are the log events that remain after known security issues at the target system have been identified and corresponding log events pertaining to the known security issues have been removed.

20. The method of claim 18, further comprising, in a third iteration of the plurality of iterations:

generating, by the processor and via user interaction, a new filter;

adding, by the processor, the new filter to the library of preexisting filters;

applying, by the processor, the new filter to the second filtered log events to generate third filtered log events; and displaying, by the processor, the third filtered log events to the user.

* * * * *